US006858990B2

(12) United States Patent
Tsukamoto

(10) Patent No.: US 6,858,990 B2
(45) Date of Patent: Feb. 22, 2005

(54) ELECTRON-EMITTING DEVICE, ELECTRON SOURCE, IMAGE FORMING APPARATUS, AND METHOD OF MANUFACTURING ELECTRON-EMITTING DEVICE AND ELECTRON SOURCE

(75) Inventor: Takeo Tsukamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 65 days.

(21) Appl. No.: 10/235,809

(22) Filed: Sep. 6, 2002

(65) Prior Publication Data

US 2003/0057860 A1 Mar. 27, 2003

(30) Foreign Application Priority Data

Sep. 7, 2001 (JP) ....................................... 2001-271172

(51) Int. Cl.⁷ ................................................ G09G 3/10
(52) U.S. Cl. ............................... 315/169.1; 315/169.3; 313/311; 313/495
(58) Field of Search ........................... 315/169.1, 169.3; 313/311, 495, 496, 497, 346 R; 345/76; 445/24, 50; G09G 3/10

(56) References Cited

U.S. PATENT DOCUMENTS

| | | | |
|---|---|---|---|
| 4,728,851 A | 3/1988 | Lambe ....................... 313/309 |
| 4,816,289 A | 3/1989 | Komatsu et al. .......... 423/447.3 |
| 4,900,483 A | 2/1990 | Witzke et al. ............... 313/309 |
| 4,904,895 A | 2/1990 | Tsukamoto et al. .......... 313/366 |
| 4,956,578 A | 9/1990 | Shimizu et al. ................ 315/3 |

(List continued on next page.)

FOREIGN PATENT DOCUMENTS

| | | | |
|---|---|---|---|
| CN | 1181607 A | 5/1998 | |
| EP | 0 290 026 A1 | 11/1988 | ............. H01J/3/02 |
| EP | 0 394 698 A2 | 10/1990 | ............. H01J/1/30 |
| EP | 0 433 507 A1 | 6/1991 | ............ D01F/9/127 |
| EP | A1 443 865 | 8/1991 | ............ H01J/21/10 |
| EP | 0 290 026 B1 | 2/1993 | ............. H01J/3/02 |

(List continued on next page.)

OTHER PUBLICATIONS

C.A. Spindt et al., Physical Properties of Thin–Film Field Emission Cathodes with Molybdenum Cones, Journal of Applied Physics, vol. 47, No. 12, (1976), pp. 5248–5263.
R.T.K. Baker et al., "Formation of Carbonaceous Deposits from the Platinum–Iron Catalyzed Decomposition of Acyetylene," 37 J. Catal. 101–105 (1975).
R.T.K. Baker, "Catalytic Growth of Carbon Filaments," 27 (3) Carbon 315–323 (1989).
S. Iijima, "Helical Microtubules of Graphitic Carbon," Nature, vol. 345, 56–58 (1991).
T. W. Ebbesen et al., "Large–Scale Synthesis of Carbon Nanotubes," Nature, vol. 358, 220–222 (1992).

(List continued on next page.)

Primary Examiner—Don Wong
Assistant Examiner—Trinh Vo Dinh
(74) Attorney, Agent, or Firm—Fitzpatrick, Cella, Harper & Scinto

(57) ABSTRACT

In an electron-emitting device having an electron-emitting member containing carbon as a main component, and an extraction electrode arranged near the electron-emitting member, electrons can be emitted by substantially only a region of the electron-emitting member close to the extraction electrode. Brightness nonuniformity and abnormal lights-on errors are reduced in an image forming apparatus in which the electron-emitting devices are constituted into an electron. The electron-emitting threshold field of the electron-emitting member is set low at a portion close to the extraction electrode and high at a portion apart from the extraction electrode.

7 Claims, 8 Drawing Sheets

U.S. PATENT DOCUMENTS

| | | | |
|---|---|---|---|
| 5,066,883 A | 11/1991 | Yoshioka et al. | 313/309 |
| 5,185,554 A | 2/1993 | Nomura et al. | 313/495 |
| 5,192,240 A | 3/1993 | Komatsu | 445/24 |
| 5,214,346 A | 5/1993 | Komatsu | 313/309 |
| 5,382,867 A | 1/1995 | Maruo et al. | 313/309 |
| 5,443,859 A | 8/1995 | Nagata | 427/122 |
| 5,458,784 A | 10/1995 | Baker et al. | 210/674 |
| 5,500,200 A | 3/1996 | Mandeville et al. | 423/447.3 |
| 5,543,684 A | 8/1996 | Kumar et al. | 313/495 |
| 5,551,903 A | 9/1996 | Kumar et al. | 445/24 |
| 5,577,943 A | 11/1996 | Vickers et al. | 445/24 |
| 5,612,587 A | 3/1997 | Itoh et al. | 313/309 |
| 5,618,875 A | 4/1997 | Baker et al. | 524/495 |
| 5,690,997 A | 11/1997 | Grow | 427/249.1 |
| 5,726,524 A | 3/1998 | Debe | 313/309 |
| 5,770,918 A | 6/1998 | Kawate et al. | 313/495 |
| 5,773,921 A | 6/1998 | Keesmann et al. | 313/309 |
| 5,847,495 A | 12/1998 | Yamanobe et al. | 313/310 |
| 5,872,422 A | 2/1999 | Xu et al. | 313/311 |
| 5,872,541 A | 2/1999 | Yoshioka et al. | 345/74.1 |
| 5,935,639 A | 8/1999 | Sullivan et al. | 427/78 |
| 5,965,267 A | 10/1999 | Nolan et al. | 428/408 |
| 5,973,444 A | 10/1999 | Xu et al. | 313/309 |
| 5,981,305 A | 11/1999 | Hattori | 438/20 |
| 5,982,091 A | 11/1999 | Konishi | 313/495 |
| 5,986,389 A | 11/1999 | Tsukamoto | 313/310 |
| 6,087,765 A | 7/2000 | Coll et al. | 313/309 |
| 6,129,602 A | 10/2000 | Yamanobe | 445/24 |
| 6,135,839 A | 10/2000 | Iwase et al. | 445/24 |
| 6,147,449 A | 11/2000 | Iwasaki et al. | 313/495 |
| 6,171,162 B1 | 1/2001 | Iwasaki et al. | 445/6 |
| 6,184,610 B1 | 2/2001 | Shibata et al. | 313/309 |
| 6,204,597 B1 | 3/2001 | Xie et al. | 313/310 |
| 6,228,904 B1 | 5/2001 | Yadav et al. | 523/210 |
| 6,231,413 B1 | 5/2001 | Tsukamoto | 445/24 |
| 6,246,168 B1 | 6/2001 | Kishi et al. | 313/495 |
| 6,283,812 B1 | 9/2001 | Jin et al. | 445/24 |
| 6,288,494 B1 | 9/2001 | Tsukamoto et al. | 315/169.1 |
| 6,290,564 B1 | 9/2001 | Talin et al. | 445/50 |
| 6,313,572 B1 | 11/2001 | Yamada | 313/310 |
| 6,331,690 B1 | 12/2001 | Yudasaka et al. | 219/121.6 |
| 6,333,016 B1 | 12/2001 | Resasco et al. | 423/447.3 |
| 6,390,612 B1 | 5/2002 | Kotaki et al. | 347/85 |
| 6,400,091 B1 | 6/2002 | Deguchi et al. | 315/169.1 |
| 6,413,487 B1 | 7/2002 | Resasco et al. | 423/447.3 |
| 6,445,006 B1 | 9/2002 | Brandes et al. | 257/76 |
| 6,448,709 B1 | 9/2002 | Chuang et al. | 313/497 |
| 6,455,021 B1 | 9/2002 | Saito | 423/447.3 |
| 6,471,936 B1 | 10/2002 | Chen et al. | 423/658.2 |
| 6,472,814 B1 | 10/2002 | Yamanobe et al. | 313/495 |
| 6,624,589 B2 * | 9/2003 | Kitamura et al. | 315/169.3 |
| 2001/0006232 A1 | 7/2001 | Choi et al. | 257/10 |
| 2002/0009593 A1 * | 1/2002 | Veerasamy | 428/408 |
| 2002/0009637 A1 | 1/2002 | Murakami et al. | 429/213 |
| 2002/0031972 A1 | 3/2002 | Kitamura et al. | 445/3 |
| 2002/0047562 A1 | 4/2002 | Kitamura et al. | 315/169.3 |
| 2002/0060516 A1 * | 5/2002 | Kawate et al. | 313/495 |
| 2002/0136896 A1 | 9/2002 | Takikawa et al. | 428/408 |
| 2002/0146958 A1 | 10/2002 | Ono et al. | 445/24 |
| 2003/0048056 A1 | 3/2003 | Kitamura et al. | 313/311 |
| 2003/0222560 A1 | 12/2003 | Roach | 313/311 |

FOREIGN PATENT DOCUMENTS

| | | | |
|---|---|---|---|
| EP | 0 535 953 A2 | 4/1993 | H01J/1/30 |
| EP | 0 614 209 A1 | 9/1994 | H01J/31/12 |
| EP | 0 535 953 B1 | 1/1996 | H01J/1/30 |
| EP | 0 716 439 A1 | 6/1996 | H01J/3/02 |
| EP | 0 758 028 A2 | 2/1997 | D01F/9/127 |
| EP | 0 797 233 A2 | 9/1997 | H01J/1/30 |
| EP | 0 836 217 A1 | 4/1998 | H01J/29/94 |
| EP | A1 871 195 | 10/1998 | H01J/1/30 |
| EP | 0 913 508 A3 | 5/1999 | D01F/9/127 |
| EP | 0 913 508 A2 | 5/1999 | D01F/9/127 |
| EP | 0 936 650 A1 | 8/1999 | H01J/3/02 |
| EP | A1 936 650 | 8/1999 | H01J/3/02 |
| EP | 0 980 089 A1 | 2/2000 | H01J/1/30 |
| EP | 0 451 208 B1 | 3/2000 | D01F/9/12 |
| EP | 0 986 084 A2 | 3/2000 | H01J/1/30 |
| EP | 1 022 763 A1 | 7/2000 | H01J/9/02 |
| EP | 1 096 533 A1 | 5/2001 | H01J/9/02 |
| EP | 1 102 299 A1 | 5/2001 | H01J/1/30 |
| EP | 1 113 478 A1 | 7/2001 | H01J/3/02 |
| EP | 1 117 118 A1 | 7/2001 | H01J/1/312 |
| EP | 1 112 344 A2 | 8/2001 | D01F/9/127 |
| EP | 1 120 877 A1 | 8/2001 | H02G/5/06 |
| EP | 1 122 344 A2 | 8/2001 | D01F/9/127 |
| EP | 1 187 161 A2 | 3/2002 | H01J/3/02 |
| EP | 0 758 028 B1 | 9/2002 | D01F/9/127 |
| GB | 2 308 495 A | 6/1997 | H01J/1/20 |
| JP | WO 89/07163 | 8/1989 | D01F/9/12 |
| JP | 1-309242 | 12/1989 | H01J/37/06 |
| JP | 2-112125 | 4/1990 | H01J/1/30 |
| JP | 3-20941 | 1/1991 | H01J/31/12 |
| JP | 03-260119 | 11/1991 | D01F/9/127 |
| JP | 03-295131 | 12/1991 | H01J/1/30 |
| JP | 04-212236 | 3/1992 | H01J/1/30 |
| JP | 05-159696 | 6/1993 | H01J/1/30 |
| JP | 05-198253 | 8/1993 | H01J/1/30 |
| JP | 5-211029 | 8/1993 | H01J/1/30 |
| JP | 05-274997 | 10/1993 | H01J/1/30 |
| JP | 7-6714 | 1/1995 | H01J/31/12 |
| JP | 08-115652 | 5/1996 | H01J/1/30 |
| JP | 8-264109 | 10/1996 | H01J/1/30 |
| JP | 08-298068 | 11/1996 | H01J/1/30 |
| JP | 9-82214 | 3/1997 | H01J/1/30 |
| JP | 09-188600 | 7/1997 | C30B/29/62 |
| JP | 10-289650 | 10/1998 | H01J/1/30 |
| JP | 11-139815 | 5/1999 | C01B/31/02 |
| JP | 11-162334 | 6/1999 | H01J/9/02 |
| JP | 11-194134 | 7/1999 | G01N/37/00 |
| JP | 11-232997 | 8/1999 | H01J/1/30 |
| JP | 2000-57934 | 2/2000 | H01J/1/304 |
| JP | 2000-86216 | 3/2000 | C01B/31/02 |
| JP | 2000-90809 | 3/2000 | H01J/1/304 |
| JP | 2000-95509 | 4/2000 | C01B/31/02 |
| JP | 2000-208028 | 7/2000 | H01J/1/304 |
| JP | 2000-223005 | 8/2000 | H01J/1/304 |
| JP | 2000/277003 | 10/2000 | H01J/9/02 |
| JP | 2001-52598 | 2/2001 | H01J/1/316 |
| JP | 2001-162600 | 6/2001 | B82B/1/00 |
| JP | 2001-176379 | 6/2001 | H01J/1/316 |
| JP | 2001-288625 A | 10/2001 | D01F/9/127 |
| WO | WO 90/07023 | 6/1990 | D01F/9/12 |
| WO | WO 98/05920 | 2/1998 | G01B/7/34 |
| WO | WO 99/58748 | 11/1999 | D01F/9/127 |
| WO | WO 01/26130 | 4/2001 | H01J/9/20 |
| WO | WO 01/93292 A1 | 12/2001 | H01J/1/304 |

OTHER PUBLICATIONS

W. A. DeHeer et al., "Aligned Carbon Nanotube Films: Production and Optical and Electronic Properties," Science vol. 268, 845–847 (1995).

T. Guo et al., "Catalytic Growth of Single–Walled Nanotubes by Laser Vaporization," Chem Phys. Lett., vol. 243, 49–54 (1995).

A. G. Rinzler et al., "Unraveling Nanotubes: Field Emission from an Atomic Wire," Science, vol. 269, 1550–1553 (1995).

W. A. DeHeer et al., "A Carbon Nanotube Field–Emission Electron Source," Science, vol. 270, 1179–1180 (1995).

T. Kyotani et al., "Preparation of Ultrafine Carbon Tubes in Nanochannels of an Anodic Aluminum Oxide Film," Chem. Mater., vol. 8, 2109–2113 (1996).

A. Thess et al., "Crystalline Ropes of Metallic Carbon Nanotubes," Science, vol. 273 483–487 (1996).

H. Dai et al., " Single–Wall Nanotubes Produced by Metal–Catalyzed Disproportionation of Carbon Monoxide," Chem. Phys. Lett., vol. 260, 471–475 (1996).

H. Dai et al., "Nanotubes as Nanoprobes in Scanning Probe Microscopy," Nature, vol. 384, 147–150 (1996).

A. C. Dillon et al., "Storage of Hydrogen in Single–Walled Carbon Nanotubes," Nature, vol. 386, 377–379 (1997).

W.P. Dyke et al., "Field Emission", *Advances in Electronics and Electron Physics*, vol. 8, (1956) pp. 89–185.

C.A. Mead, "Operation of Tunnel–Emission Devices", *Journal of Applied Physics*, vol. 32, No. 4, (1961), pp. 646–652.

Toshiaki Kusunoki et al., "Fluctuation–Free Electron Emission from Non–Formed Metal–Insulator–Metal (MIM) Cathodes Fabricated by Low Current Anodic Oxidation", *Japanese Journal of Applied Physics*, vol. 32 No. 11B, (1993), p. L.1695–1697.

M.I. Elinson et al., "The Emission of Hot Electrons and the Field Emission of Electrons from Tin Oxide", *Radio Engineering and Electronic Physics*, (1965) pp. 1290–1296.

G. Dittmer, "Electrical Conduction and Electron Emission of Discontinuous Thin Films", *Thin Solid Films*, vol. 9, (1972) pp. 317–329.

M. Hartwell et al., "Strong Electron Emission from Patterned Tin–Indium Oxide Thin Films", IEEE Trans. Ed. Conf., (1983) pp. 519–521.

Hisashi Araki et al., Electroforming and Electron Emission of Carbon Thin Films, Journal of the Vacuum Society of Japan, 1983 (with English Abstract on p. 22).

Rodriguez et al., "Catalytic Engineering of Carbon Nanostructures," Langmuir 11, 3862–3866 (1995).

W. Zhu Et al., *Electron Field Emission From Nanostructured Diamond and Carbon Nanotubes*, Solid State Electronics, vol. 45, 2001, pp. 921–928.

J.M. Bonard et al., *Field Emission From Carbon Nanotubes: The First Five Years*, Solid State Electronics, vol. 45, 2001, pp. 893–914.

A.M. Rao et al., "In Situ–grown Carbon Nanotube Array of with Excellent Field Emission Characteristics," Applied Physics Letter, vol. 76, No. 25, pp. 3813–3815 (2000).

Cheol Jin Lee et al., "Carbon Nanofibers Grown on Sodalime Glass at 500° C. Using Thermal Chemical Vapor Deposition," Chemical Physics Letters 340, pp. 413–418 (2001).

Sashiro Uemura et al., "Carbon Nanotube FED with Graphite–Nano–Fiber Emitters," ISSN 1083–1312, pp. 398–401.

Q. H. Wang et al., "A Nanotube–Based Field Emission Flat Panel Display," Applied Physics Letters, vol. 72, No. 22, Jun. 1998, pp. 2912–2913.

* cited by examiner

PRIOR ART

ELECTRON-EMITTING DEVICE, ELECTRON SOURCE, IMAGE FORMING APPARATUS, AND METHOD OF MANUFACTURING ELECTRON-EMITTING DEVICE AND ELECTRON SOURCE

BACKGROUND OF THE INVENTION

1. Field of the Invention

The present invention relates to an electron-emitting device, an electron source using the same, and an image forming apparatus serving as a television broadcasting display apparatus, a display apparatus for a video conference system or computer, or an optical printer using a photosensitive drum or the like.

2. Related Background Art

An FE (Field Emission) electron-emitting device which emits electrons from a metal surface by applying a high field of 10 V/cm or more to a metal has received a great deal of attention as one of cold electron sources.

In recent years, flat display apparatuses using liquid crystals have been replacing CRTs in image forming apparatuses such as a display apparatus. The flat display apparatuses are not of self-emission type and require a backlight, and thus demands arise for self-emission display apparatuses.

If an FE cold electron source becomes commercially available, it implements a flat self-emission image display apparatus, contributing to low power consumption and light weight.

A known example of a vertical FE electron source is one disclosed in C. A. Spindt, "Physical Properties of Thin-Film Field Emission Cathodes with Molybdenum Cones", J. Appl. Phys., 47, 5248 (1976).

A diode structure in which a carbon nanotube is formed close to one terminal of an electrode is described in SID (Society for Information Display) Digest p. 386, 2000. By shifting the electron-emitting member to one terminal of the electrode, a higher field is formed at the terminal than at the center of the electrode. The high-field region formed only at the end of the electron-emitting region narrows the orbit of emitted electrons, obtaining a small electron beam spot.

Also, an electron-emitting device with a triode structure (only section) is proposed in 17th IDW (International Display Workshop) Digest p. 1005, 2000. This structure is shown in FIG. 7. In FIG. 7, an electron-emitting member is formed from a substrate 71, lower electrode (gate electrode) 72, insulating layer 73, upper electrode (cathode) 74, and carbon nanotubes 75. An anode (fluorescent substance) 76 is arranged above the electron-emitting member. The insulating layer 73 is formed from two, $SiO_2$ and polyimide insulating layers. In this device, the lower electrode 72 is set to a high potential to form a high field between the upper and lower electrodes. The field causes the carbon nanotubes 75 formed on the upper electrode 74 to emit electrons, which reach the anode 76 serving as a fluorescent substance.

SUMMARY OF THE INVENTION

It is reported that a conventional carbon nanotube exhibits a threshold field of several V/$\mu$m necessary for electron emission. The use of an electron-emitting material having a low threshold field for an electron-emitting device with the triode structure decreases the voltage necessary for electron emission. This reduces not only the cost of the driving apparatus but also the power consumption.

However, when a high voltage is applied between the anode and the cathode, electrons may be directly emitted by the electron-emitting member on the cathode and reach the anode depending on conditions owing to a field formed between the cathode and the anode without applying any voltage to the gate electrode. In this situation, the orbit of electrons is different from that of electrons emitted by applying a voltage to the gate. Electrons do not reach a prospective region on the anode, and modulation by the gate electrode cannot be achieved. This causes misregistration in the image forming apparatus as an abnormal lights-on error, degrading the image quality. This phenomenon at even one portion in the image forming apparatus leads to an apparatus defect to narrow the design width of the image forming apparatus.

It is an object of the present invention to solve the above-described problems.

According to the present invention, there is provided an electron-emitting device comprising: an electron-emitting member containing carbon as a main component; and an extraction electrode arranged near the electron-emitting member, wherein an electron-emitting threshold field (a threshold electric field needed to starting of electron emission) of the electron-emitting member is low at a portion close to the extraction electrode and high at a portion apart from the extraction electrode.

According to the present invention, there is provided a method of manufacturing an electron-emitting device having an electron-emitting member containing carbon as a main component, and an extraction electrode arranged near the electron-emitting member, the method comprising a threshold field control step of performing processing so as to give an electron-emitting threshold field of the electron-emitting member a different value depending on a distance from the extraction electrode.

In the above-described electron-emitting device, an example of the electron-emitting member containing carbon as a main component includes a plurality of fibrous carbon elements, and the fibrous carbon elements are made of a material which has an $sp^2$ bond and is selected from the group consisting of a graphite nanofiber, a carbon nanotube, amorphous carbon, and a mixture of at least two materials selected from the group consisting of the graphite nanofiber, the carbon nanotube, and amorphous carbon. Another example of the electron-emitting member containing carbon as a main component includes a thin film made of a material that has an $sp^3$ bond and is selected from the group consisting of diamond, diamond-like carbon, amorphous carbon, and a mixture of at least two materials selected from the group consisting of diamond, diamond-like carbon, and amorphous carbon.

In the above-described manufacturing method, an example of the threshold field control step includes the step of partially etching the electron-emitting member in an atmosphere of a substance which can chemically react with the electron-emitting member.

An example of the substance which can chemically react with the electron-emitting member includes water, oxygen, and carbon dioxide. In the threshold field control step, the electron-emitting member can emit electrons. At this time, a negative potential with respect to the electron-emitting member is applied to the extraction electrode, and a positive potential with respect to the electron-emitting member is applied to an anode arranged in opposite to the electron-emitting member via vacuum.

There is provided an electron source comprising at least one electron-emitting device array constituted by arranging a plurality of electron-emitting devices described above parallel to each other and connecting the electron-emitting devices. There is provided an electron source comprising at least one electron-emitting device array constituted by arranging a plurality of electron-emitting devices described above, wherein low-potential supply wiring lines and high-potential supply wiring lines which drive the electron-emitting devices are arranged in a matrix. There is provided an image forming apparatus comprising the above-described electron source, and an image forming member which forms an image by electrons emitted by the electron source, wherein an electron-emitting amount of each electron-emitting device of the electron source is controlled by an information signal.

In a method of manufacturing an electron source in which at least one array of a plurality of electron-emitting devices is arranged on an insulating substrate, and low-potential supply wiring lines and high-potential supply wiring lines which drive the electron-emitting devices are arranged in a matrix, the electron-emitting devices are manufactured by the above-described manufacturing method. An example of the threshold field control step is line-sequentially performed by selecting an array of the electron-emitting devices and driving each array. Another example of the threshold field control step is point-sequentially performed by selecting an electron-emitting device and driving the selected device.

The electron-emitting device and electron source according to the present invention can emit electrons from substantially only a region of the electron-emitting member close to the extraction electrode. The image forming apparatus constituted using the electron source can form a high-quality image almost free from brightness nonuniformity and abnormal lights-on errors.

DETAILED DESCRIPTION OF THE PREFERRED EMBODIMENT

A preferred embodiment of the present invention will be described below, but the present invention is not limited by the embodiment.

One method of forming electron-emitting members having different electron-emitting threshold field depending on the distance from an extraction electrode in the present invention will be explained with reference to FIG. 2.

Figure 2:
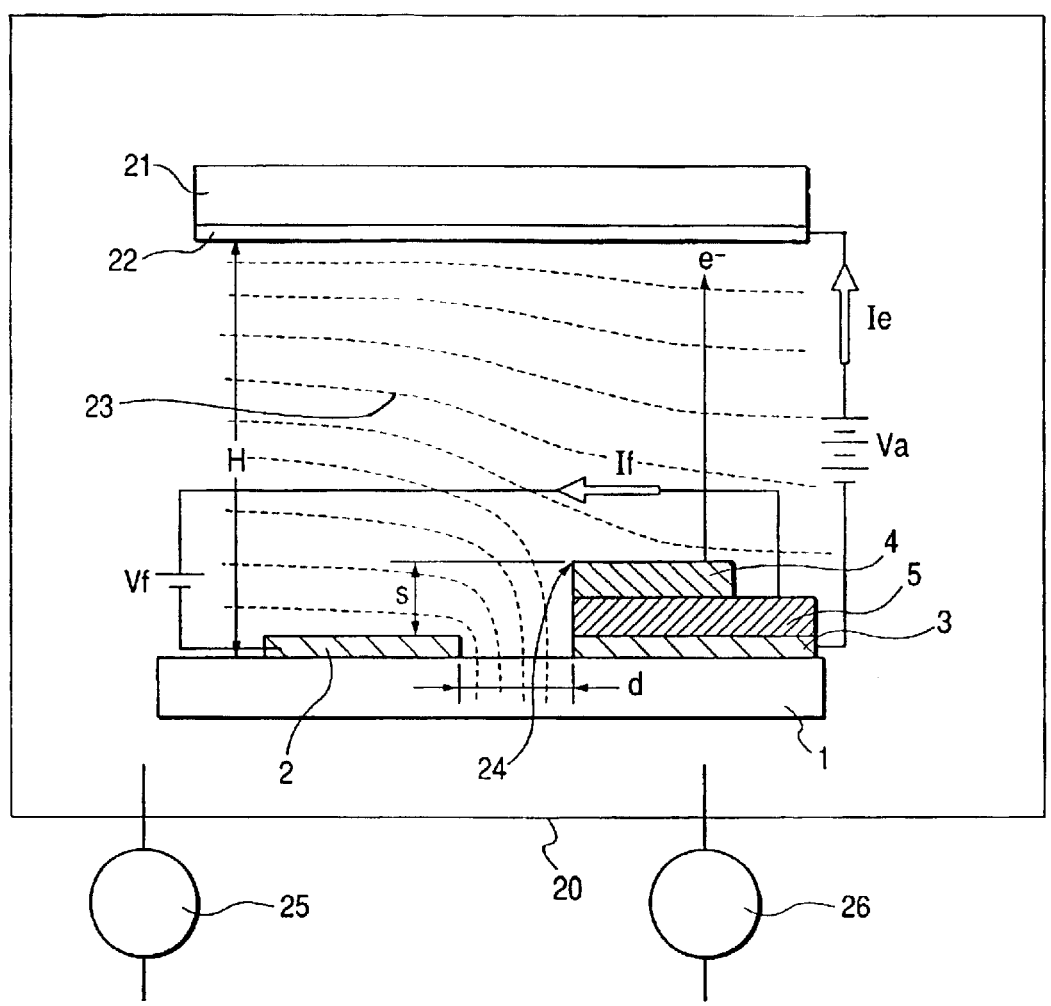
FIG. 2 is a view for explaining the threshold field control step in the electron-emitting device manufacturing method of the present invention.

In FIG. 2, an extraction electrode (also referred to as a "gate electrode" or "gate") 2, a cathode electrode (also referred to as an "emitter electrode") 3, an electron-emitting member 4, and a conductive material 5 are formed on a rear substrate 1. This electron-emitting device is set in a vacuum vessel 20. An anode electrode 22 is formed on an anode substrate 21. Equipotential lines 23 are formed between the anode and the electron-emitting device, and represent given potentials. An uppermost plane 24 of the electron-emitting member is defined by a height s from the gate electrode. The vacuum vessel 20 is connected to an evacuation apparatus 25, and a vessel 26 contains a substance which reacts chemically or physically with the electron-emitting member. Both the cathode electrode 3 and conductive material 5 may be called a cathode electrode (also referred to as an "emitter electrode").

A gap between the electrodes 2 and 3 is defined as a distance d. A distance between the rear substrate 1 and the anode substrate 21 is defined as a distance H.

First, the device is arranged in the vacuum vessel 20, and a vacuum is produced using the evacuation apparatus 25. A voltage is applied to the device so as to set the extraction electrode 2 to a low potential and the electron-emitting member 4 to a high potential. Then, a higher potential Va than that of the electron-emitting member 4 is applied to the anode 22 which faces the substrate 1 by the distance H. At this time, the equipotential lines 23 as shown in FIG. 2 are formed.

As is apparent from FIG. 2, an equipotential line 23 having a specific potential is formed on the surface of the electron-emitting member 4 such that the equipotential line 23 is spaced apart from the electron-emitting member 4 in a region closest to the gate electrode 2 and comes close to the electron-emitting member 4 as the line 23 is spaced apart from the gate electrode 2. That is, on the surface of the electron-emitting member 4, the electric field intensity is low in a region close to the gate electrode 2 and high in a region apart from the gate electrode 2.

In this state, an electric field intensity in a region apart from the gate electrode reaches a electric field strength (intesity) enough to emit electrons under proper conditions of the anode voltage Va and height H. Electrons are emitted from an electron-emitting member in a region apart from the gate electrode, whereas no electrons are emitted in a region close to the gate electrode.

In this situation, the valve (not shown) of the vessel 26 containing a substance which reacts with the electron-emitting member 4 is opened to introduce a small amount of reactive substance into the vacuum vessel 20.

The substance which reacts with the electron-emitting member 4 mainly includes two types of substances: a substance which reacts chemically and a substance which reacts physically. Examples of the substance which reacts chemically are $O_2$, $H_2O$, and $CO_2$ for a carbon electron-emitting member 4. The substance which reacts physically is a substance which changes into a charged particle by an electron beam, and is preferably a substance with a relatively large mass number such as Ar. The introduction pressure of the substance gas, which changes depending on the type of gas, is generally about $1\times10^{-4}$ Pa to $1\times10^{1}$ Pa in order to chemically react with the electron-emitting member 4 during the electron emission, and about $1\times10^{-6}$ Pa to $1\times10^{1}$ Pa in order to physically react.

In this situation, the portion which emits electrons is highly chemically active due to high temperatures or the like. At this portion, chemical reaction with the electron-emitting member progresses at a higher speed than in a region where no electrons are emitted. The electron-emitting member is chemically etched away, and changes its form or disappears, thus increasing the electron-emitting threshold field.

At the portion which emits electrons, emitted electrons ionize the gas of the substance which is introduced into vacuum and physically reacts. Ions collide against the electron-emitting portion. Then, the electron-emitting portion is etched away, and changes its form or disappears, increasing the electron-emitting threshold field.

In the threshold field control step accompanied with potential application according to the present invention, a portion which easily emits electrons (easily enhances the electric field intensity) intensively reacts and is etched in the electron-emitting region to remove a portion where the electric field is excessively concentrated. As a result, electron-emitting members having different electron-emitting threshold fields are formed in the direction of distance from the gate.

In the present invention, a bundle of a plurality of fibrous carbon is preferably used as the electron-emitting member 4. The fibrous carbon has a very large aspect ratio and easily enhances the electric field intensity. The fibrous carbon can therefore emit electrons at a low voltage, and is preferably used as the electron-emitting member 4 of the present invention.

The "fibrous carbon" in the present invention can be called a "pillar substance containing carbon as a main component" or "linear substance containing carbon as a main component" or "carbon fiber". The "fibrous carbon" can also be referred to as a "fiber containing carbon as a main component". More specifically, the "fibrous carbon" in the present invention includes a carbon nanotube, graphite nanofiber, and amorphous carbon fiber. Of these materials, the graphite nanofiber is the most preferable as the electron-emitting member.

A material preferably adopted as the electron-emitting member 4 is a bundle of a plurality of carbon fibers.

Figure 8:
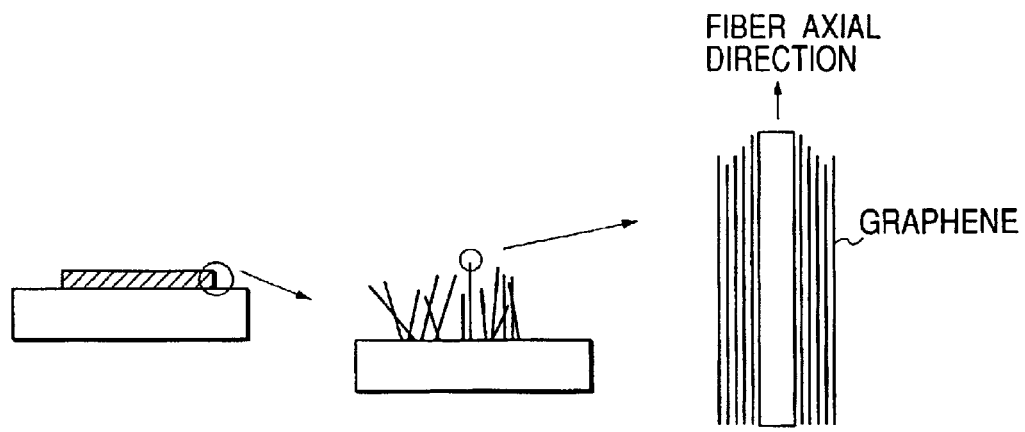
FIG. 8 is a view showing a form of fibrous carbon.
Figure 9:
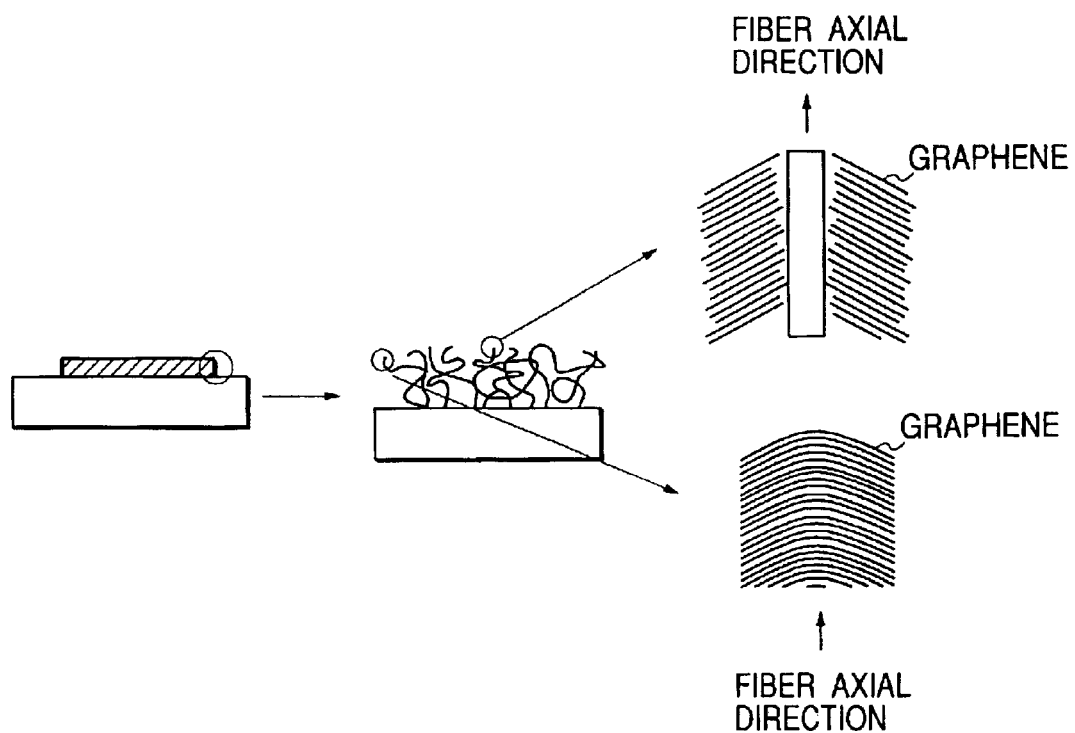
FIG. 9 is a view showing another form of fibrous carbon.

The fibrous carbon(carbon fiber) has a threshold field of several V/$\mu$m. FIGS. 8 and 9 show forms of the fibrous carbon. In FIGS. 8 and 9, a form observed at the optical microscope level (up to ×1,000) is schematically shown on the left side; a form observed at the scanning electron microscope (SEM) level (up to ×30,000), at the center; and a carbon form observed at the transmission electron microscope (TEM) level (up to ×1,000,000), on the right side.

As shown in FIG. 8, the cylindrical form of graphene (multiple cylindrical structure is called a multi-wall nanotube) is called a carbon nanotube, and its threshold field decreases the most in a structure in which the distal end of the tube is open. More specifically, the carbon nanotube is a fibrous substance in which graphene is so arranged as to surround (cylindrically) the tube in the longitudinal direction (fiber axial direction). In other words, the carbon nanotube is a fibrous substance in which graphene is arranged substantially parallel to the fiber axis.

FIG. 9 shows a fibrous carbon form which can be generated at relatively low temperatures. Fibrous carbon with this form is made from a graphene multilayered member (thus called a "graphite nanofiber"). More specifically, the graphite nanofiber means a fibrous substance in which graphene is stacked in the longitudinal direction (fiber axial direction). In other words, the graphite nanofiber is a fibrous substance in which graphene is arranged not parallel to the fiber axis.

One plane(sheet) of graphite is called a "graphen" or a "graphen sheet". More specifically, graphite comprises a plurality of stacked or layered carbon planes. Each carbon plane comprises a repeated hexagon having a carbon atom at each vertex thereof and having a covalent bond along each side thereof. The covalent bond is caused by $sp^2$ hybrid orbitals of carbon atoms. Ideally, the distance(interval) between the neighboring carbon planes is $3.354 \times 10^{-10}$ m. Each carbon plane is called "graphene" or a "graphene sheet".

Either fibrous carbon has an electron-emitting threshold field of about 1 to 10 V/$\mu$m, and is preferable as the material of the electron-emitting member 4 in the present invention.

In particular, an electron-emitting device using a graphite nanofiber aggregate can emit electrons with a low field, obtain a large emission current, be easily manufactured, and provide an electron-emitting device having a stable electron-emitting characteristic. Comparing to the electron-emitting device comprising a plurality of carbon nanotubes (a bundle of carbon nanotubes), the electron-emitting device comprising a plurality of graphite nanofibers(a bundle of graphite nanofibers) can be expected to obtain more electron emission current and/or stable electron emission.

For example, an electron-emitting device can be formed by using the graphite nanofiber as an emitter and preparing an electrode which controls electron emission from this emitter. A light-emitting apparatus such as a lamp can be formed by using a light-emitting member which emits light by irradiation of electrons emitted by the graphite nanofiber. An image display apparatus such as a display can also be constituted by arraying a plurality of electron-emitting devices using the graphite nanofiber and preparing an anode electrode with a light-emitting member such as a fluorescent substance.

The electron-emitting apparatus, light-emitting apparatus, and image display apparatus using the graphite nanofibers or carbon nanotubes can stably emit electrons without keeping the interior in ultrahigh vacuum, unlike a conventional electron-emitting device. Since electrons are emitted with a low field, a high-reliability apparatus can be very easily manufactured. From this, the manufacturing method of the present invention can be preferably applied to a device using the graphite nanofiber or carbon nanotube.

The fibrous carbon can be formed by decomposing hydrocarbon gas using a catalyst (material which accelerate generating of carbon). The carbon nanotube and graphite nanofiber change depending on the type of catalyst and the decomposition temperature.

As the catalyst material, Fe, Co, Pd, Ni, or an alloy of at least two materials selected from them is available as a nucleus (catalyst) for forming fibrous carbon.

Particularly, Pd and Ni can generate a graphite nanofiber at low temperatures (temperature of 400° C. or higher). Since the generation temperature of a carbon nanotube using Fe and Co must be 800° C. or higher, low-temperature formation of a graphite nanofiber material using Pd and Ni is preferable in terms of the influence on another member and the manufacturing cost.

The nucleus formation material can be palladium oxide by using a property that an oxide is reduced by hydrogen at a low temperature (room temperature).

Hydrogen reduction processing for palladium oxide can form an initial aggregation nucleus at a relatively low temperature without using thermal aggregation of a metal thin film or generation and vapor deposition of ultrafine particles conventionally used as a general nucleus formation method.

Examples of the hydrocarbon gas are hydrocarbon gases such as acetylene, ethylene, methane, propane, and propylene, CO gas, $CO_2$ gas, and the vapor of an organic solvent such as ethanol or acetone.

When fibrous carbon is used for the electron-emitting member 4, the catalyst particle is applied to a desired region (on the cathode electrode 3), and introduced hydrocarbon gas is thermally decomposed. As a result, a bundle of a plurality of carbon fibers can be directly grown on the cathode electrode 3 via the catalyst particles. Alternatively, carbon fibers can be separately formed. In this case, carbon fibers are mixed in ink or paste and applied onto the cathode electrode 3 by printing or coating. The applied ink or paste is heated to form a bundle of carbon fibers on the cathode electrode 3. As printing or coating, various general printing methods can be applied. More specifically, a known method such as screen-printing, dispenser coating, and ink-jet printing can be adopted. In the example of FIG. 2, the cathode electrode 3 and conductive material 5 are separate members. However, the conductive material 5 is not always necessary, and may be made of the same material as that of the cathode electrode 3.

In order to suppress scattering of emitted electrons on the gate electrode in the electron-emitting device of the present invention, a plane which includes the surface of the electron-emitting member 4 and is substantially parallel to the surface of the substrate 1 is preferably arranged at a position more apart from the substrate surface than a plane which includes part of the surface of the gate electrode 2 and is substantially parallel to the surface of the substrate 1 (see FIG. 2). In other words, in the electron-emitting apparatus of the present invention, the plane which includes part of the surface of the electron-emitting member 4 and is substantially parallel to the surface of the substrate 1 is arranged between the anode electrode 22 and the plane which includes part of the surface of the gate electrode 2 and is substantially parallel to the surface of the substrate 1 (see FIG. 2).

In the electron-emitting device of the present invention, the electron-emitting member 4 is arranged at the height s (defined by the distance between the plane which includes part of the surface of the gate electrode 2 and is substantially parallel to the substrate 1 and the plane which includes the surface of the electron-emitting member 4 and is substantially parallel to the surface of the substrate 1 (see FIG. 2)) at which no scattering substantially occurs on the gate electrode 2.

The height s depends on the ratio of a vertical electric field intensity to a horizontal electric field intensity (vertical electric field intensity/horizontal electric field intensity). The height is smaller as the ratio is higher, and larger as the ratio is lower. The practical range of the height s is 10 nm (inclusive) to 10 $\mu$m (inclusive).

The "horizontal electric field" in the present invention is "an electric field substantially parallel to the surface of the substrate 1", or "an electric field in a direction in which the gate electrode 2 and cathode electrode 3 face each other".

The "vertical electric field" in the present invention is "an electric field in a direction substantially perpendicular to the surface of the substrate 1", or "an electric field in a direction in which the substrate 1 and anode electrode 22 face each other".

In the electron-emitting apparatus of the present invention, as shown in FIG. 2, let d be the interval between the cathode electrode 3 and the gate electrode 2, Vf be the potential difference (voltage between the cathode electrode 3 and the gate electrode 2) upon driving the electron-emitting device, H be the distance between the anode electrode 22 and the surface of the substrate 1 on which the device is arranged, and Vb be the potential difference between the anode electrode 22 and the cathode electrode 3. In this case, the electric field intensity in driving (horizontal electric field intensity): $E1=Vf/d$ is set equal to or 50 times or less than an anode-cathode electric field intensity(vertical electric field intensity): $E2=Va/H$.

This setting can reduce the ratio of electrons which are emitted by the cathode electrode 3 and collide against the gate electrode 2. Consequently, a high-efficiency electron-emitting device with less spread of an emitted electron beam can be obtained.

Figure 3:
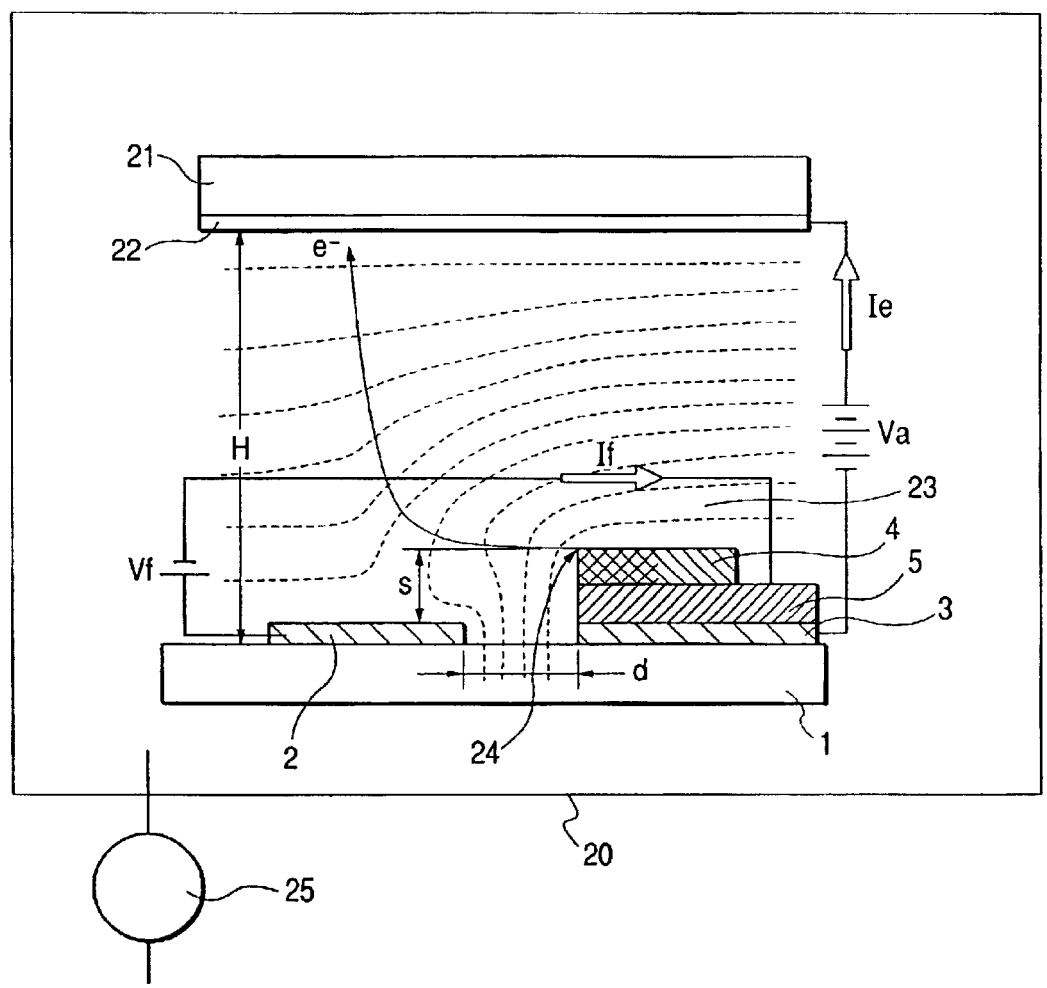
FIG. 3 is a view showing an arrangement when the electron-emitting device according to the present invention is operated.

Driving of the electron-emitting device of the present invention having electron-emitting members with different electron-emitting threshold fields will be explained with reference to FIG. 3. In FIG. 3, the same reference numerals as in FIG. 2 denote the same parts.

In FIG. 3, the device is arranged in the vacuum vessel 20, and a vacuum is produced using the evacuation apparatus 25. A voltage is applied to the device so as to apply a potential opposite to that in FIG. 2, i.e., a high potential to the gate electrode 2 and a low potential to the electron-emitting member 4. At this time, the equipotential lines 23 are shown in FIG. 3. are formed.

As is apparent from FIG. 3, an equipotential line 23 having a specific potential is formed on the surface of the electron-emitting member 4 such that the equipotential line 23 comes close to the electron-emitting member 4 in a region closest to the gate electrode 2 and is spaced apart from the electron-emitting member 4 as the line 23 is spaced apart from the gate electrode 2. That is, on the surface of the electron-emitting member 4, the electric field intensity is high in a region close to the gate electrode 2 and low in a region apart from the gate electrode 2.

For this reason, electrons can be mainly emitted from the area 24. That is, the step of changing the above-mentioned electron-emitting threshold field on the surface of the electron-emitting member 4 is adopted while an electric field intensity(strength) equal to or higher than an elctric field intensity(strength) necessary for actual driving is applied. Electrons are mainly emitted from the electron-emitting member 4 in a region close to the gate electrode 2, and no electrons are substantially emitted from an electron-emitting member region apart from the gate electrode 2.

This can prevent phenomena such as an abnormal lights-on state in which electrons are emitted without applying any potential to the gate electrode, which poses a problem in the image forming apparatus.

EXAMPLES

Examples of the present invention will be described in detail.

Example 1

Figure 1A:
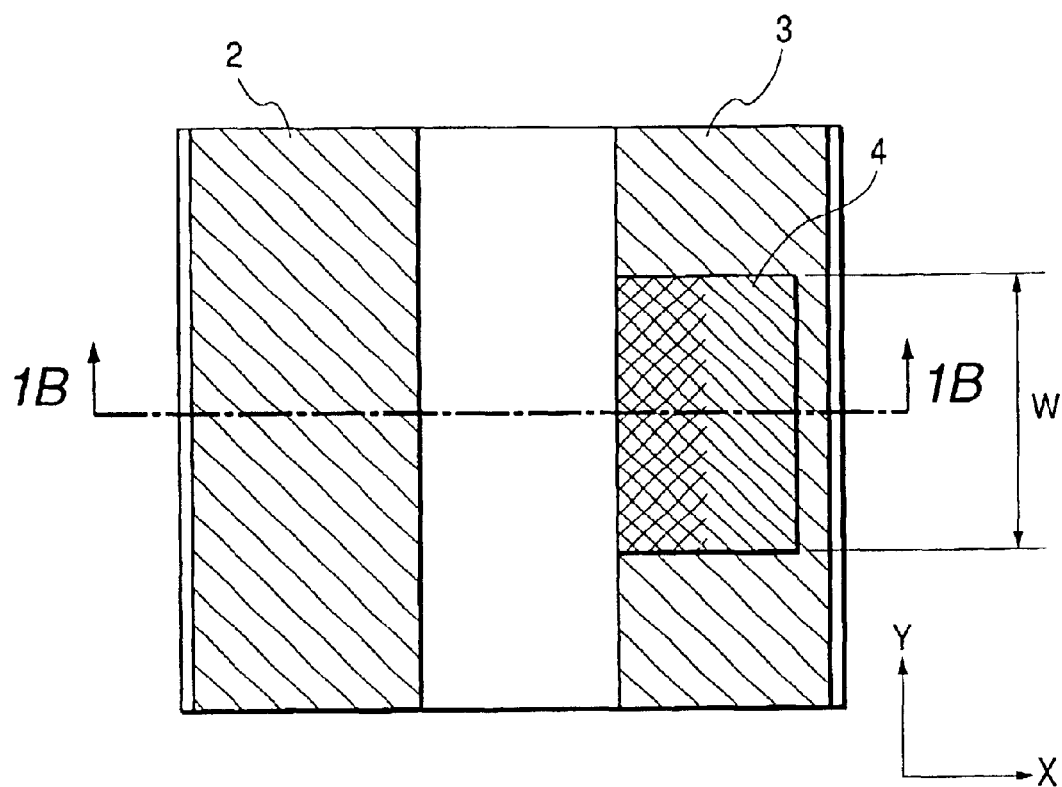
FIGS. 1A and 1B are views showing an example of a basic electron-emitting device according to the present invention.
Figure 1B:
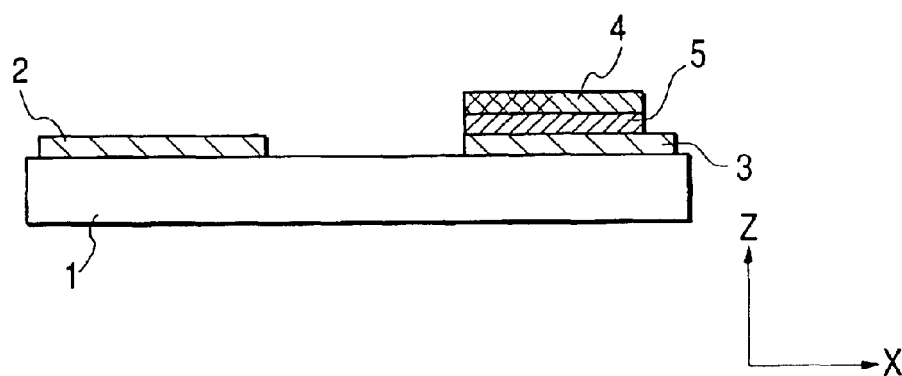

FIG. 1A shows the state of an electron-emitting device fabricated in Example 1 when viewed from above the device. FIG. 1B is a sectional view taken along the line 1B—1B.

In FIGS. 1A and 1B, the electron-emitting device is formed from an insulating substrate 1, extraction electrode 2, cathode electrode 3, electron-emitting member (emitter material) 4, and conductive layer 5 on which fibrous carbon can grow.

The electron-emitting device manufacturing process of Example 1 will be explained in detail with reference to FIGS. 4A to 4F.

(Step 1)

A quartz substrate was used as the substrate 1 and fully cleaned. After that, Ti and Pt were successively sputtered to thicknesses of 5 nm and 30 nm, respectively, as the gate electrode 2 and cathode (emitter) electrode 3.

A resist pattern was formed using a positive photoresist (AZ1500 available from Clariant) by photolithography.

Figure 4A:
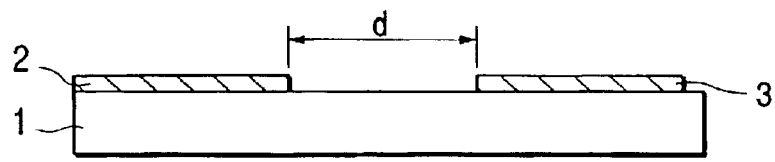
FIGS. 4A, 4B, 4C, 4D, 4E, and 4F are views showing steps in manufacturing an electron-emitting device according to Example 1.

The Pt and Ti layers were dry-etched by Ar gas using the patterned photoresist as a mask, thereby forming an extraction electrode (gate electrode) 2 and cathode electrode 3 with an electrode gap d of 5 μm (FIG. 4A).

(Step 2)

Figure 4B:
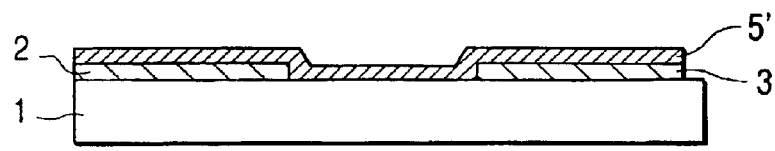

The substrate temperature was kept at 300° C., TiN was deposited to a thickness of 500 nm by reactive sputtering of sputtering Ti with etching gas prepared by mixing nitrogen in Ar, thereby forming a TiN layer 5' (FIG. 4B).

(Step 3)

Figure 4C:
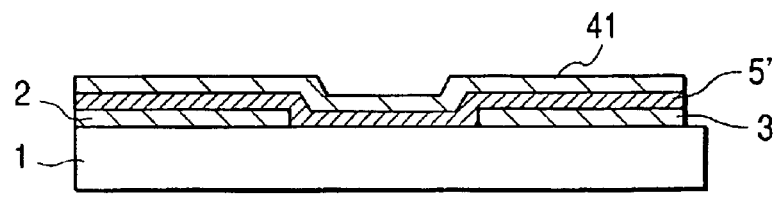

After the substrate was sufficiently cooled to room temperature, Pd was deposited by an amount enough to form an island by sputtering using Ar gas with the same evacuation apparatus as that in step 2, thus forming an island-like Pd layer 41 (FIG. 4C).

(Step 4)

A resist pattern was formed using a positive photoresist (AZ1500 available from Clariant) by photolithography.

Figure 4D:
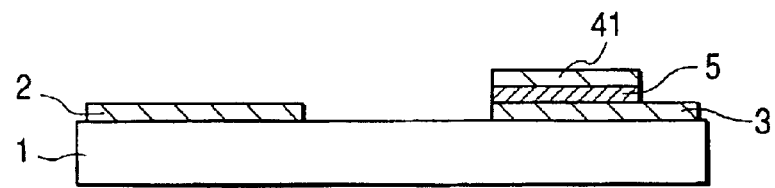
Figure 4E:
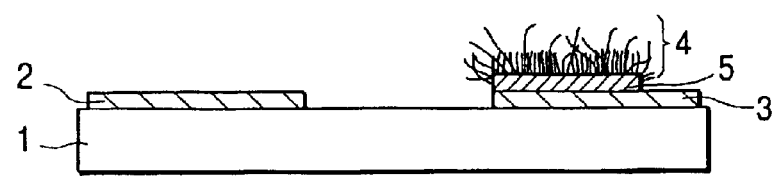
Figure 4F:
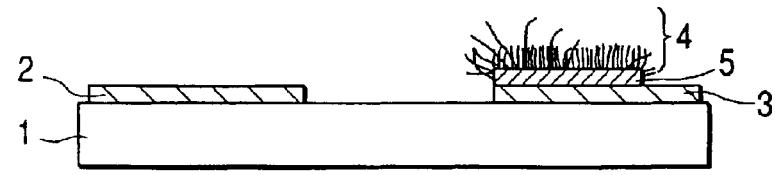

The island-like Pt layer 41 and TiN layer 5' were dry-etched by $CF_4$ gas using the patterned photoresist as a mask, thereby forming a metal catalyst (island-like Pd layer 41) on only one electrode (i.e., cathode electrode 3) (FIG. 4D).

(Step 5)

Subsequently, the resultant structure was annealed at 500° C. for 10 min in a flow of gas prepared by mixing 1% hydrogen diluted with nitrogen at the atmospheric pressure and nitrogen-diluted 0.1% acetylene at 1:1. The structure was observed by a scanning electron microscope to find that many fibrous carbon elements (electron-emitting members 4) about 5 nm to 250 nm in diameter which bent and fibrously extended were formed in the Pd formation region (FIG. 4D). At this time, the fibrous carbon thickness was about 5 μm.

The device was set in a vacuum vessel 20 as shown in FIG. 2, and the interior of the vacuum vessel 20 was sufficiently evacuated to $2 \times 10^{-5}$ Pa by an evacuation apparatus 25. Then, a valve for an $H_2O$ etching gas 26 was opened to set a vacuum degree of $1 \times 10\ -4$ Pa in the vacuum vessel 20.

An anode voltage Va=2 kV was applied to an anode (anode electrode) 22 apart from the device by H=0.1 mm. At that time, the cathode electrode 3 was set to ground potential, and a DC voltage ranging from Vf=–10 V to –100 V was applied to the gate electrode 2.

At the beginning of this step, electrons were emitted from a region of the electron-emitting member 4 apart from the gate electrode 2, and an electron current of about 50 μA was observed. This current gradually decreased to 1 nA.

In this state, the device form was observed to find that fibers excessively longer than the average thickness of formed fibrous carbon decreased in the region of fibrous carbon (electron-emitting member 4) apart from the gate electrode 2. Depending on the anode voltage Va, distance H, and application voltage Vf, the average thickness of initial fibrous carbon tended to decrease as fibrous carbon was spaced apart from the gate electrode 2 (see FIG. 4F).

The device was set in a vacuum vessel 20 as shown in FIG. 3, and the interior of the vacuum vessel 20 was sufficiently evacuated to $2 \times 10^{-5}$ Pa by an evacuation apparatus 25.

Then, an anode voltage Va=10 kV was applied to the anode (anode electrode) 22 apart from the device by H=2 mm. At that time, the cathode electrode 3 was set to ground potential, and a pulse voltage ranging from Vf=+20 V to +100 V was applied to the gate electrode 2. For a device length (W in FIG. 1A) of 300 μm, an electron-emitting current of 10 μA was observed.

Electrons were emitted by only the portion 24 shown in FIG. 3, and only one beam spot was confirmed when the fluorescent substance was set on the anode side.

Example 2

Figure 5:
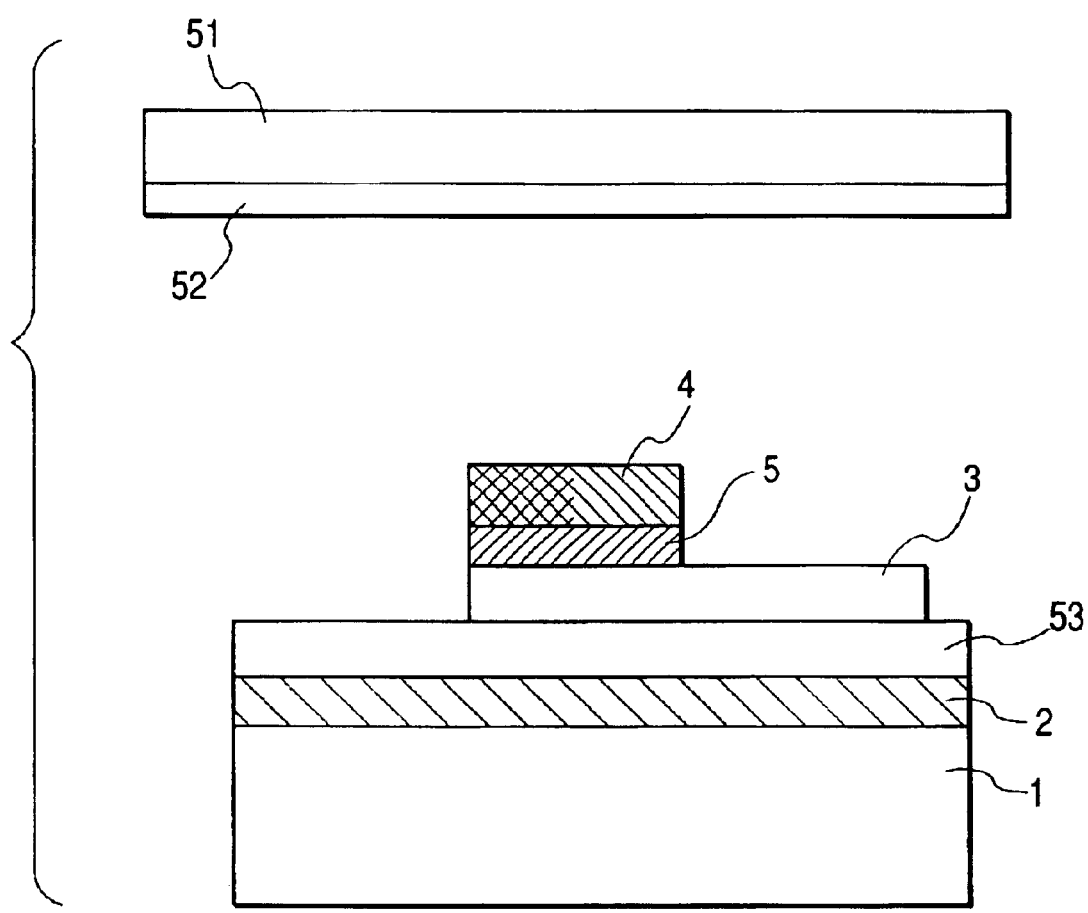
FIG. 5 is a view showing an electron-emitting device according to Example 2.

FIG. 5 is a view showing an electron-emitting device in Example 2. In FIG. 5, the electron-emitting device is formed from a substrate 1, lower electrode (gate electrode) 2, upper electrode (cathode electrode) 3, conductive layer 5 on which fibrous carbon can grow, electron-emitting member 4 made of a carbon material, anode substrate 51, anode electrode 52, and interlayer dielectric film 53. The manufacturing method of this device will be described below.

In Example 2, a soda lime-based high-strain-point glass substrate was used as the substrate 1.

A lower electrode 2 made of a silver-based wire about 3 μm in thickness and about 350 μm in width was formed on the substrate 1 using screen printing.

$SiO_2$ was sputtered as an interlayer dielectric film material to a thickness of about 1 μm on the entire substrate surface. Successively, Ti was sputtered to 5 nm (not shown due to a small thickness) as a layer contact to $SiO_2$, and Pt was deposited as an upper electrode material to a thickness of about 100 nm.

Ti was sputtered to a thickness of 5 nm as the conductive layer 5 on which fibrous carbon can grow. Pd was sputtered into an island-like film 5 nm or less in thickness (not shown due to a small thickness) as a catalyst layer.

A pattern corresponding to the shape of the upper electrode 3 was formed using photolithography resist.

The substrate was set in a dry etching apparatus. Pd as the catalyst layer and Ti as the fibrous carbon-growable conductive layer 5 were dry-etched away with $SF_6$ gas by using the resist pattern as a mask. Pt as the upper electrode material was dry-etched away using Ar gas, and Ti as the $SiO_2$ contact layer was removed using HBr gas.

$SiO_2$ as the interlayer dielectric film material was dry-etched away using a gas prepared by mixing proper amounts of $CF_4$ and $H_2$. The resist used as a mask was removed to form an interlayer dielectric film 53 and upper electrode 3 having desired pattern shapes.

The substrate was set in a furnace, and gas in the furnace was satisfactorily exhausted. Thereafter, nitrogen-diluted 1% hydrogen and nitrogen-diluted 1% ethylene were introduced into the furnace up to the atmospheric pressure at a ratio of 1:1.

After the substrate was heated to 600° C. and kept for 30 min in the furnace, black fibrous carbon (electron-emitting member) 4 was grown on the entire upper electrode.

The grown fibrous carbon was observed by a transmission electron microscope to find that graphene was formed in a multilayered structure, as shown on the right side of FIG. 9.

The step of changing the electron-emitting threshold field of the electron-emitting member was the same as that in Example 1.

In Example 2, a pulse voltage was used to apply a low potential to the gate electrode 2. When pulses stop, the electron-emitting threshold field of a region of the electron-emitting member 4 apart from the gate electrode 2 changes. In addition, the electron-emitting threshold field of a region of the electron-emitting member 4 close to the gate electrode 2 increases. Hence, with the use of the pulse method, like Example 2, the electron-emitting threshold field between devices could be set to a desired value. The increase ratio over time could be controlled by changing the pulse duty.

Example 3

Example 3 concerns an image forming apparatus constituted using an electron source obtained by arranging a plurality of electron-emitting devices of the present invention. The electron source will be described with reference to FIG. 6.

Figure 6:
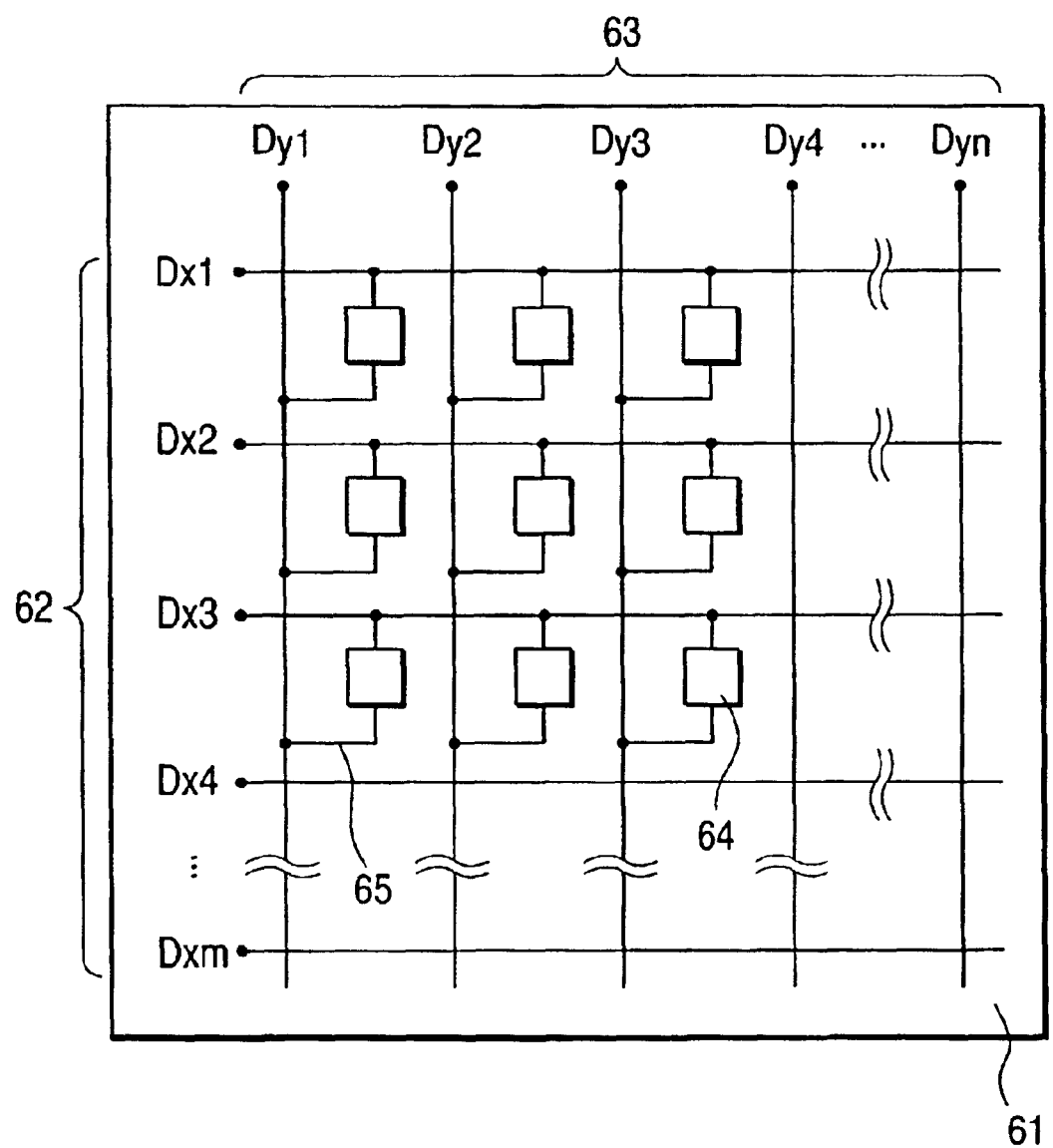
FIG. 6 is a view showing an arrangement of a matrix circuit using a plurality of electron-emitting devices according to the present invention.
Figure 7:
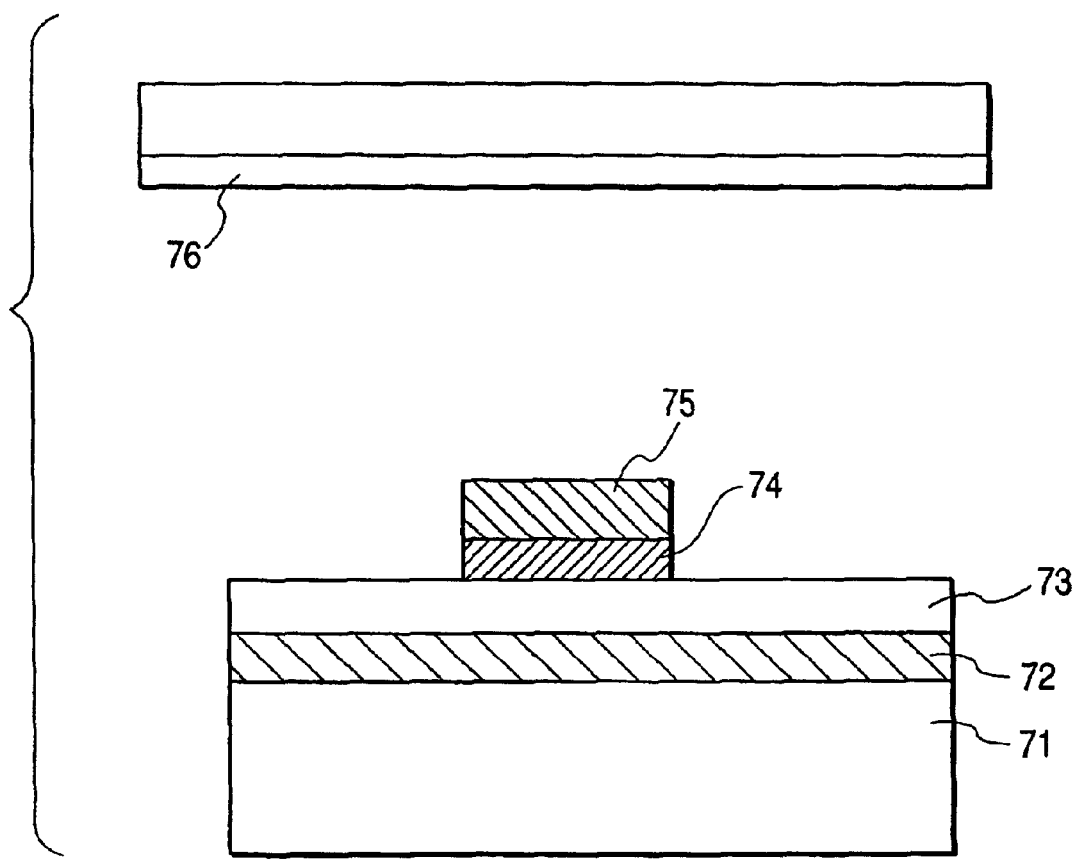
FIG. 7 is a view showing a conventional multilayered FE device.

In FIG. 6, the electron source is made up of an electron source substrate 61, X-direction wiring lines 62, Y-direction wiring lines 63, electron-emitting devices 64 of the present invention, and connections 65.

If the device capacitance increases owing to the arrangement of a plurality of electron-emitting devices, the waveforms becomes blunt due to the capacitive component even upon application of a short pulse accompanying pulse width modulation, failing to obtain an expected tone level. In Example 3, an interlayer dielectric film was arranged to reduce an increase in capacitive component at a portion other than the electron-emitting portion.

In FIG. 6, m X-direction wiring lines 62 include Dx1, Dx2, . . . , Dxm, and are made of an aluminum-based wiring material about 1 μm in thickness and 300 μm in width formed by vapor deposition. The wiring material, film thickness, and width are appropriately designed. The Y-direction wiring lines 63 include n wiring lines Dy1, Dy2, . . . , Dyn 0.5 μm in thickness and 100 μm in width, and are formed similarly to the X-direction wiring lines 62. An interlayer dielectric film (not shown) is interposed between the m X-direction wiring lines 62 and the n Y-direction wiring lines 63, and electrically insulates them. The X- and Y-direction wiring lines 62 and 63 are extracted as external terminals. Note that m and n represent positive integers.

The interlayer dielectric film (not shown) was formed from $SiO_2$ about 5 μm in thickness by sputtering or the like. All or part of the surface of the substrate 61 on which the X-direction wiring lines 62 were formed was formed into a desired shape. To resist the potential difference at the intersection between the X- and Y-direction wiring lines 62 and 63, the thickness of the interlayer dielectric film was so determined as to attain a device capacitance of 1 pF or less per device and a device breakdown voltage of 30 V.

gate electrode and cathode electode Pairs (not shown) which constitute the electron-emitting devices 64 of the present invention are electrically connected by the m X-direction wiring lines 62, the n Y-direction wiring lines 63, and the connections 65 made of a conductive metal or the like.

Each X-direction wiring line 62 is connected to a scanning signal application means (not shown) for applying a scanning signal for selecting a row of electron-emitting devices 64 of the present invention aligned in the X direction. Each Y-direction wiring line 63 is connected to a modulation signal generation means (not shown) for modulating in accordance with an input signal each array of the electron-emitting devices 64 of the present invention aligned in the Y direction. A driving voltage applied to each electron-emitting device is supplied as a difference voltage between the scanning and modulation signals supplied to the device.

If X-direction rows and Y-direction arrays increase in a matrix as shown in FIG. 6, the application voltage to respective devices may vary due to the voltage drop in selecting all the electron-emitting devices in the matrix and performing the threshold field control step at once. To prevent this, the threshold field control step is preferably executed line-sequentially or point-sequentially.

The line-sequential threshold field control step will be described. For example, the same voltage is applied to the n Y-direction wiring lines Dy1, Dy2, . . . , Dyn. A positive voltage with respect to the Y-direction wiring line is applied to Dx1 to select electron-emitting devices on the row Dx1 and perform threshold field control processing. Then, the same voltage is applied to Dx2 to select electron-emitting devices on the row Dx2 and perform threshold field control processing. Similarly, the rows Dx3, Dx4, . . . , Dxm are selected to sequentially perform threshold field control processing in the X direction. This processing can reduce the influence of the voltage drop.

The point-sequential threshold field control step is a method of selecting individual devices so as to enable independently driving them by using the matrix wiring, and performing the threshold field control step sequentially for the electron-emitting devices one by one. This method is free from the influence of the voltage drop, but the processing time is proportional to the number of devices. Thus, line-sequential processing, point-sequential processing, and simultaneous processing are chosen in accordance with the size of the electron source and the use purpose.

In Example 3, an anode whose entire substrate surface was covered with an ITO film (Indium Tin Oxide compound) was set at a height H=0.3 mm above the matrix substrate, and the anode voltage Va was set to 6 kV.

Then, $O_2$ was introduced into the vacuum vessel so as to set the interior to $1 \times 10^{-4}$ Pa. The n Y-direction wiring lines Dy1, Dy2, . . . , Dyn were commonly grounded. The pulse voltage Vf=−50V to −100 V (pulse voltage width: 1 msec, pulse interval: 10 msec) was applied to Dx1 to select electron-emitting devices on the row Dx1 and perform threshold field control processing. The same voltage was applied to Dx2 to select electron-emitting devices on the row Dx2 and perform threshold field control processing. Similarly, the rows Dx3, Dx4, . . . , Dxm were selected and sequentially underwent threshold field control processing in the X direction.

As a result, the same threshold field control as that of a single-bit device could be achieved on all the devices.

As has been described above, the electron-emitting device and electron source according to the present invention can emit electrons from only a region of the electron-emitting member close to the extraction electrode.

The image forming apparatus constituted using the electron source of the present invention can form a high-quality image almost free from brightness nonuniformity and abnormal lights-on errors. A high-quality image forming apparatus such as a flat high-definition color television can be implemented.

What is claimed is:

1. An electron-emitting device comprising:

an extraction electrode, and an electron-emitting member containing carbon, said electron emitting member having at least a first region and a second region located farther away from said extraction electrode than the first region, wherein an electron-emitting threshold field needed for an electron emission from the second region is higher than an electron-emitting threshold field needed for an electron emission from the first region.

2. The electron-emitting device according to claim 1, wherein said electron-emitting member containing carbon includes a plurality of carbon fibers, and the carbon fibers are made of a material which has a sp² bond and is selected from the group consisting of a graphite nanofiber, a carbon nanotube, amorphous carbon, and a mixture of at least two materials selected from the group consisting of the graphite nanofiber, the carbon nanotube, and amorphous carbon.

3. The electron-emitting device according to claim 1, wherein said electron-emitting member containing carbon includes a plurality of carbon fibers, each carbon fiber has a plurality of graphenes which are stacked so as not to be parallel to an axis direction of each carbon fiber.

4. An electron source comprising a plurality of electron-emitting devices each of which is an electron-emitting device according to claim 1.

5. The electron source, according to claim 4, further comprising
low-potential supply wirings and high-potential supply wirings arranged in a matrix form.

6. An image forming apparatus comprising an electron source as defined in claim 4 and an image forming member which forms an image by electrons emitted by said electron source.

7. A television comprising an image forming apparatus as defined in claim 6.

* * * * *

UNITED STATES PATENT AND TRADEMARK OFFICE
CERTIFICATE OF CORRECTION

PATENT NO. : 6,858,990 B2
DATED : February 22, 2005
INVENTOR(S) : Takeo Tsukamoto It is certified that error appears in the above-identified patent and that said Letters Patent is hereby corrected as shown below:

<u>Title page,</u>
Item [56], References Cited, FOREIGN PATENT DOCUMENTS,
"EP 1 112 344 A2 8/2001 …. D01F/9/127" should be deleted and
"JP 2000/277003 10/2000 …. H01J/9/02" should read -- JP2000-277003 10/2000 …. H01J/9/02 --; and
OTHER PUBLICATIONS,
"Baker" reference (first occurrence), "Acy-" should read -- Ac- --.
"DeHeer" reference (first occurrence), "Science" should read -- Science, --.
"Thess" reference, "vol. 273" should read -- vol. 273, --.
"Araki" reference, "Electroforming" should read -- "Electroforming --; and
"Films," should read -- Films," --.
"Zhu" reference, "Et" should read -- et --; and
"Letter," should read -- Letters, --.
"Lee" reference, "Letters" should read -- Letters, --.

<u>Column 1,</u>
Line 20, "10 V/cm" should read -- $10^6$ V/cm --.

<u>Column 2,</u>
Line 22, "to" should read -- for --.

<u>Column 4,</u>
Line 41, "a" should read -- an --.

<u>Column 8,</u>
Line 25, "are" (first occurrence) should read -- as --; and
Line 40, elctric" should read -- electric --.

<u>Column 9,</u>
Line 4, "thicknesse" should read -- thicknesses --;
Line 15, "sputtering" should be deleted;
Line 45, "1x10-4 Pa" should read -- $1 \times 10^{-4}$ Pa --.

<u>Column 11,</u>
Line 48, "gate" should read -- Gate -- and "Pairs" should read -- pairs --.

UNITED STATES PATENT AND TRADEMARK OFFICE
CERTIFICATE OF CORRECTION

PATENT NO.   : 6,858,990 B2
DATED        : February 22, 2005
INVENTOR(S)  : Takeo Tsukamoto It is certified that error appears in the above-identified patent and that said Letters Patent is hereby corrected as shown below:

Column 12,
Line 58, "electron emitting" should read -- electron-emitting --.

Column 13,
Line 1, "a" (second occurrence) should read -- an --.

Signed and Sealed this

Thirty-first Day of January, 2006

JON W. DUDAS
*Director of the United States Patent and Trademark Office*